J. J. DUNN.
TIRE PUMP.
APPLICATION FILED OCT. 22, 1913.
1,182,536.
Patented May 9, 1916.
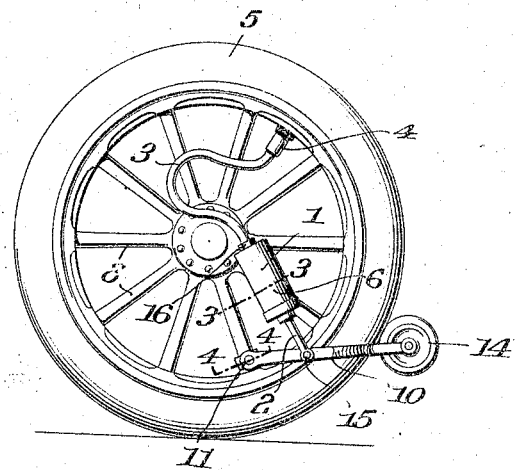
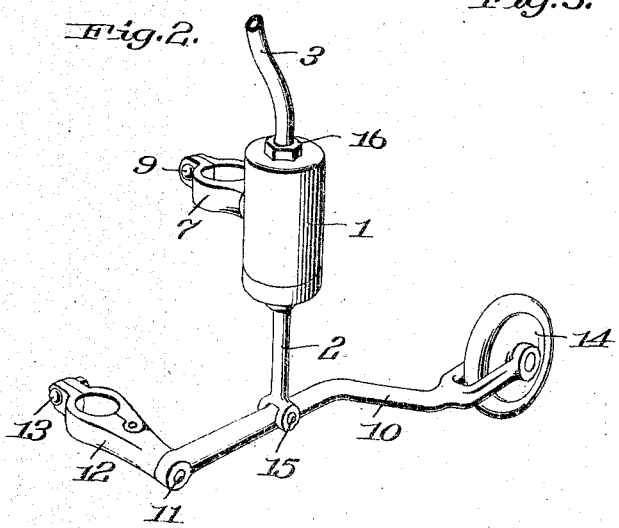
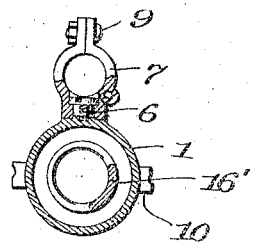
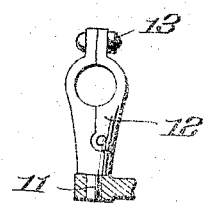
Witnesses
Gerald Hennesy.
P. M. Smith
Inventor
Julius J. Dunn,
By Victor J. Evans
Attorney

UNITED STATES PATENT OFFICE.

JULIUS J. DUNN, OF DENVER, COLORADO.

TIRE-PUMP.

1,182,536.     Specification of Letters Patent.     Patented May 9, 1916.

Application filed October 22, 1913. Serial No. 796,672.

*To all whom it may concern:*

Be it known that I, JULIUS J. DUNN, a citizen of the United States, residing at Denver, in the county of Denver and State of Colorado, have invented new and useful Improvements in Tire-Pumps, of which the following is a specification.

This invention relates to tire pumps, the object of the invention being to provide a pump adapted to be readily attached to any one of the wheels of an automobile or other vehicle equipped with inflated tires, the pump hereinafter described operating automatically to inflate the tire of the wheel to which it is attached, as the machine or vehicle is driven, and without any attention on the part of the operator.

With the above and other objects in view, the invention consists in the construction, combination and arrangement of parts, as will hereinafter be more fully described, illustrated and claimed.

In the accompanying drawings:—Figure 1 is a side elevation of a wheel showing the automatic pump of this invention applied thereto. Fig. 2 is a perspective view of the pump detached from the wheel. Fig. 3 is a cross section on the line 3—3 of Fig. 1. Fig. 4 is a cross section on the line 4—4 of Fig. 1.

The pump contemplated in this invention comprises a pump cylinder 1 in which the usual piston and valves are mounted, 2 designating the piston rod working through one end of the pump cylinder, the pump being conventionally shown as of the ordinary common reciprocatory type.

At the end opposite the piston rod 2, a flexible pipe 3 extends from the pump cylinder and is provided at its free end with an internally threaded nozzle 4 adapted to screw upon the valve casing of the inflatable tube contained within the tire 5.

The pump cylinder 1 is pivotally mounted about centrally of the length thereof at the point 6 on a clip 7 which is adapted to be fastened to any one of the spokes 8 of the wheel, the clip 7 being shown as corresponding in shape to the cross sectional shape of the spoke which it is adapted to embrace as illustrated in Fig. 3 and to be secured by means of a clamping element 9 thus adapting the pump to be mounted on and adjusted longitudinally of one of the spokes of any wheel of the machine or vehicle.

The pump is operated automatically by means of a pump operating arm 10 which is pivotally connected at 11 to a spoke engaging and embracing clip 12 which may be readily applied to any spoke of the wheel adjusted longitudinally thereof and held in place thereon by means of a clamping element 13. The arm 10 is of sufficient length to extend a considerable distance beyond the tread of the wheel where it is provided with a ground contacting roller 14 journaled on the extremity of the arm or lever 10 so at so avoid any possibility of the extremity of said arm catching in the ground and demolishing the pump. The arm or lever 10 is offset so as to carry the wheel clear of the mud guard and said arm or lever 10 is pivotally connected at 15 to the extremity of the piston rod 2 by means of a pivot which is shown in the form of a bolt that may be detached for the purpose of disconnecting the arm or lever 10 from the piston rod 2. The flexible tube 3 is also connected detachably at 16 to the cylinder 1 of the pump. In this way the said parts of the pump as a whole may be disconnected so as to provide for the compact storage of the same in the machine or vehicle.

From the foregoing description it will now be understood that as the vehicle wheel 5 revolves, in each revolution thereof the wheel 14 comes in contact with the ground and is thrust inwardly within the circumference of the wheel, after which the arm or lever 10 is thrown outward by means of a spring 16 which is shown as encircling the piston rod 2, said spring being compressed when the arm or lever 10 is thrust inward. In this way the pump piston is reciprocated once in each revolution of the vehicle wheel and in a short time the tire will be inflated automatically without any further attention on the part of the operator.

The pump is so constructed that it may be applied either to a right or left hand wheel of the machine and the construction described also provides for reversing the position of the arm or lever 10 so as to locate the wheel 14 at either side of the longitudinal axis of the pump cylinder 1.

The pump hereinabove described is especially useful in connection with tires having what is known as a slow leak, the pump serving to keep the tire inflated until a repair place is reached.

By adjusting the pump attaching clips lengthwise of the spokes of the wheel, any desired degree of projection may be given to the ground wheel 14, thus varying the stroke of the pump as may be found desirable. The flexible tube 3 provides for the adjustment of the cylinder supporting clip to any point throughout the length of the spoke to which it is attached.

What is claimed is:—

An automatic tire inflating pump comprising a cylinder and piston pump proper, a spoke engaging pump supporting clip on which the pump cylinder is mounted to rock, said clip being adjustable longitudinally of one of the spokes and radially of the wheel, a flexible tube leading from the discharge end of said pump cylinder and adapted to connect with the valve tube of the tire, a pump operating lever pivotally attached to the piston rod of the pump and projecting at one end beyond the tread of the wheel so as to contact with the ground, a clip adjustable longitudinally of one of the spokes and radially of the wheel and to which the other end of said lever is pivotally attached, and a ground wheel journaled on the outer end of said lever.

In testimony whereof I affix my signature in presence of two witnesses.

JULIUS J. DUNN.

Witnesses:
CHARLES V. MULLEN,
CORNELIUS F. MCHENRY.